United States Patent
Kobayashi et al.

(10) Patent No.: US 10,459,519 B2
(45) Date of Patent: Oct. 29, 2019

(54) FUNCTION ALLOCATION FOR VIRTUAL CONTROLLER

(71) Applicant: Google LLC, Mountain View, CA (US)

(72) Inventors: Tony Kobayashi, Berkeley, CA (US);
Paul Du Bois, Oakland, CA (US);
Lauren Winston, Mountain View, CA (US)

(73) Assignee: Google LLC, Mountain View, CA (US)

( * ) Notice: Subject to any disclaimer, the term of this patent is extended or adjusted under 35 U.S.C. 154(b) by 106 days.

(21) Appl. No.: 15/794,265

(22) Filed: Oct. 26, 2017

(65) Prior Publication Data
US 2018/0203502 A1    Jul. 19, 2018

Related U.S. Application Data

(60) Provisional application No. 62/448,172, filed on Jan. 19, 2017.

(51) Int. Cl.
| | |
|---|---|
| *G06F 3/01* | (2006.01) |
| *G06T 19/00* | (2011.01) |
| *G06F 3/0487* | (2013.01) |
| *G06F 3/0346* | (2013.01) |

(52) U.S. Cl.
CPC .............. *G06F 3/011* (2013.01); *G06F 3/016* (2013.01); *G06F 3/017* (2013.01); *G06F 3/0346* (2013.01); *G06F 3/0487* (2013.01); *G06T 19/00* (2013.01); *G06F 3/012* (2013.01)

(58) Field of Classification Search
CPC . G06F 3/01; G06F 3/011; G06F 3/017; G06F 3/0346; G06F 3/0481; G06F 3/04815; G06F 3/04842; G06F 3/0487; G06F 1/163; G06T 19/00; G06T 19/006; H04B 1/3833
See application file for complete search history.

(56) References Cited

U.S. PATENT DOCUMENTS

| | | | |
|---|---|---|---|
| 9,937,415 B1 * | 4/2018 | Makuch | ............... A63F 13/06 |
| 2006/0097453 A1 | 5/2006 | Feldman et al. | |

(Continued)

FOREIGN PATENT DOCUMENTS

| | | |
|---|---|---|
| CN | 105892675 A | 8/2016 |
| EP | 1879129 A1 | 1/2008 |

(Continued)

OTHER PUBLICATIONS

"Introducing the iTapStick: Video Game USB Mouse Stick for Wii Nunchuk Controllers", Adafruit Industries, https://learn.adafruit.com/nunchuket-kung-fu-pc-video-game-fightingstick, Sep. 3, 2016, 14 pages.

(Continued)

*Primary Examiner* — Sardis F Azongha
(74) *Attorney, Agent, or Firm* — Brake Hughes Bellermann LLP

(57) ABSTRACT

A method includes: associating, in a computer system, a virtual controller with a physical controller; allocating a first function to the virtual controller, the allocation providing for performance of the first function using the physical controller; detecting a gesture performed using the physical controller; and in response to detecting the gesture, de-allocating the first function from, or allocating a second function to, the virtual controller.

21 Claims, 6 Drawing Sheets

(56) References Cited

U.S. PATENT DOCUMENTS

| | | | |
|---|---|---|---|
| 2011/0276891 A1* | 11/2011 | Ecko | G06F 3/017 |
| | | | 715/739 |
| 2016/0117029 A1 | 4/2016 | Zatkin et al. | |
| 2016/0249043 A1 | 8/2016 | Kim et al. | |
| 2016/0267712 A1 | 9/2016 | Nartker et al. | |
| 2017/0249019 A1* | 8/2017 | Sawyer | G02B 27/017 |
| 2017/0329440 A1* | 11/2017 | Sturm | G06F 3/011 |
| 2018/0321493 A1* | 11/2018 | Kim | G02B 27/01 |

FOREIGN PATENT DOCUMENTS

| | | | |
|---|---|---|---|
| WO | 2007062238 A2 | 5/2007 | |
| WO | WO-2016094568 A1 * | 6/2016 | G06F 3/011 |

OTHER PUBLICATIONS

"Vive Pre User Guide", 2016 HTC Corporation, 28 pages.
International Search Report and Written Opinion for International Application PCT/US2017/059029, datd Mar. 15, 2018, 10 pages.

* cited by examiner

FUNCTION ALLOCATION FOR VIRTUAL CONTROLLER

CROSS-REFERENCE TO RELATED APPLICATION

This application is a non-provisional of, and claims the benefit of the filing date of, U.S. Provisional Application No. 62/448,172, filed on Jan. 19, 2017, and entitled "FUNCTION ALLOCATION FOR VIRTUAL CONTROLLER", the contents of which are incorporated herein by reference.

TECHNICAL FIELD

This document relates, generally, to function allocation for one or more virtual controllers.

BACKGROUND

Some virtual reality (VR) programs use one or more physical controllers that the user can manipulate to control aspects of the VR program. Different functions can be assigned to the controllers, so that the user can perform different tasks using the left and right hands, respectively. However, a user may wish to use the opposite hands than what the system has assigned. Making this change can require the user to navigate through a settings menu of the VR program which can be cumbersome, especially if the user must interact with the program using the "wrong" hand until the setting can be changed. Some systems use controllers that are physically identical and can allocate them upon system start-up, regardless of the user's preference. Other systems have physically different controllers for the left and right hands, making it difficult or impossible for a user to reallocate by switching the physical controllers.

SUMMARY

In a first aspect, a method includes: associating, in a computer system, a virtual controller with a physical controller; allocating a first function to the virtual controller, the allocation providing for performance of the first function using the physical controller; detecting a gesture performed using the physical controller; and in response to detecting the gesture, de-allocating the first function from, or allocating a second function to, the virtual controller.

The physical controller, and other physical controllers described herein, may typically be a controller device for holding in the hand of a user, that is a handheld controller. The physical controller is typically adapted to enable the user to provide inputs to the computer system, such as by translational and/or rotational movement of the controller, and/or by use of buttons, switches, detectors and other control elements provided on or by the controller. The virtual controller, and other virtual controllers described herein, may then be a virtual or logical controller which is represented in a virtual reality space presented to the user of the physical controller. The position and/or movement of the virtual controller in the virtual space may then typically correspond to, or be responsive to, the position and/or movement of the physical controller. The gesture, and other gestures described herein may typically be provided by a particular translational and/or rotational movements and/or trajectories of the physical controller, and therefore typically also of the virtual controller in the virtual space.

Implementations can include any or all of the following features.

If the virtual controller is defined as a first virtual controller, and the physical controller is defined as a first physical controller, the method may then further comprise associating a second virtual controller in the computer system with a second physical controller, and allocating the second function to the second virtual controller. In response to detecting the gesture, the first function may be de-allocated from the first virtual controller and allocated to the second virtual controller, and the second function may be de-allocated from the second virtual controller and allocated to the first virtual controller.

The first function may include a brush function in a virtual painting program and the second function may include a palette function in the virtual painting program, wherein detecting the gesture triggers a swapping of the brush function and the palette function in the virtual painting program.

The gesture may be made using the first and second physical controllers. For example, the gesture may involve the first and second physical controllers being brought towards each other and thereafter away from each other, or respective ends of the first and second physical controllers being brought toward each other and the ends then brought apart from each other.

The respective ends of the first and second physical controllers may be respective bottom ends of the first and second physical controllers, for example where each controller can be defined as having a top end and a bottom end when oriented in normal hand held use in a neutral position, for example where the top end is nearer to the user's thumb and index finger, and the bottom end is nearer to the user's little finger.

The first and second physical controllers may be identical to, or substantially the same as, each other.

The method may further include storing, in response to detecting the gesture, the de-association of the first function from, or the association of the second function with, the virtual controller, as a default in the computer system.

The virtual controller may be defined in a virtual space generated by the computer system, and wherein the first function is de-allocated from the virtual controller in response to detecting the gesture, the method further comprising defining a point in the virtual space, and, in response to detecting the gesture, associating the first function with the point. The second function may have already been allocated to the virtual controller before the gesture was detected.

In this context also, the virtual controller may be defined as a first virtual controller, and the physical controller defined as a first physical controller, the method further comprising: associating a second virtual controller in the computer system with a second physical controller; and allocating the second function to the second virtual controller.

The method may further include allocating the second function also to the first virtual controller. For example, the first function may include a palette function in a virtual painting program, wherein the second function includes a brush function in the virtual painting program, and wherein the de-association of the first function from the first virtual controller provides that the first and second physical controller can both be used to perform the brush function in the virtual painting program.

In the various aspects mentioned above and discussed in more detail below, the gesture may be detected using a sensor which may, for example, be located on the physical controller. The described methods may then further include extrapolating velocity and position information about the physical controller from sensor data generated by the sensor and/or may further include extrapolating orientation data about the physical controller from the sensor data.

The invention also provides one or more computer readable media carrying computer program code for putting the described methods in to effect. For example, the invention provides a computer program product that is tangibly embodied in a non-transitory storage medium, the computer program product including instructions that when executed cause a processor to perform operations including: associating, in a computer system, a virtual controller with a physical controller; allocating a first function to the virtual controller, the allocation providing for performance of the first function using the physical controller; detecting a gesture performed using the physical controller; and in response to detecting the gesture, de-associating the first function from, or associating a second function with, the virtual controller.

The invention also provides apparatus arranged to put the described methods into effect. For example, the invention provides a system including: a processor; and a computer program product tangibly embodied in a non-transitory storage medium, the computer program product including instructions that when executed cause the processor to perform operations including: associating, in a computer system, a virtual controller with a physical controller; allocating a first function to the virtual controller, the allocation providing for performance of the first function using the physical controller; detecting a gesture performed using the physical controller; and in response to detecting the gesture, de-associating the first function from, or associating a second function with, the virtual controller.

Such a system may also comprise one or more physical controllers as required for implementing the associated methods.

BRIEF DESCRIPTION OF DRAWINGS

Like reference symbols in the various drawings indicate like elements.

DETAILED DESCRIPTION

This document describes examples of function allocation for a virtual controller. A person who is using or about to use a virtual reality (VR) application can conveniently re-allocate or re-associate at least one function between two or more physical controllers of the VR system. In some embodiments, the person can perform a predefined gesture to initiate the re-allocation or re-association. For example, the person can bring respective ends of the physical controllers towards each other and then away from each other, to signal the intent that the function(s) should be re-allocated. This can be an easier, quicker and/or more intuitive way of re-allocating VR functionality between controllers than navigating through a menu system, for example.

Figure 1A:
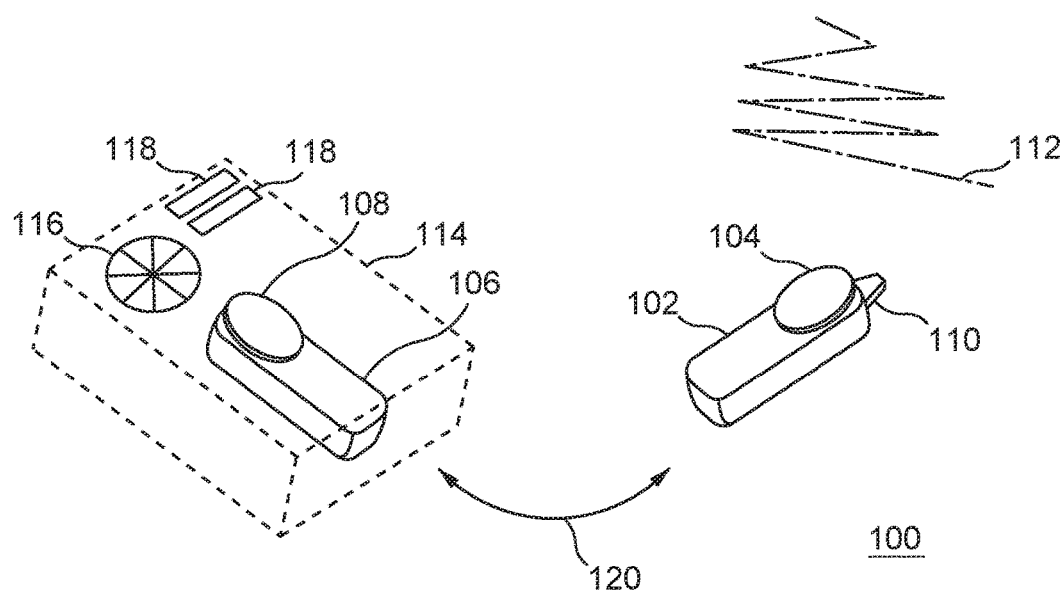
FIGS. 1A-B show an example of function allocation for virtual controllers.
Figure 1B:
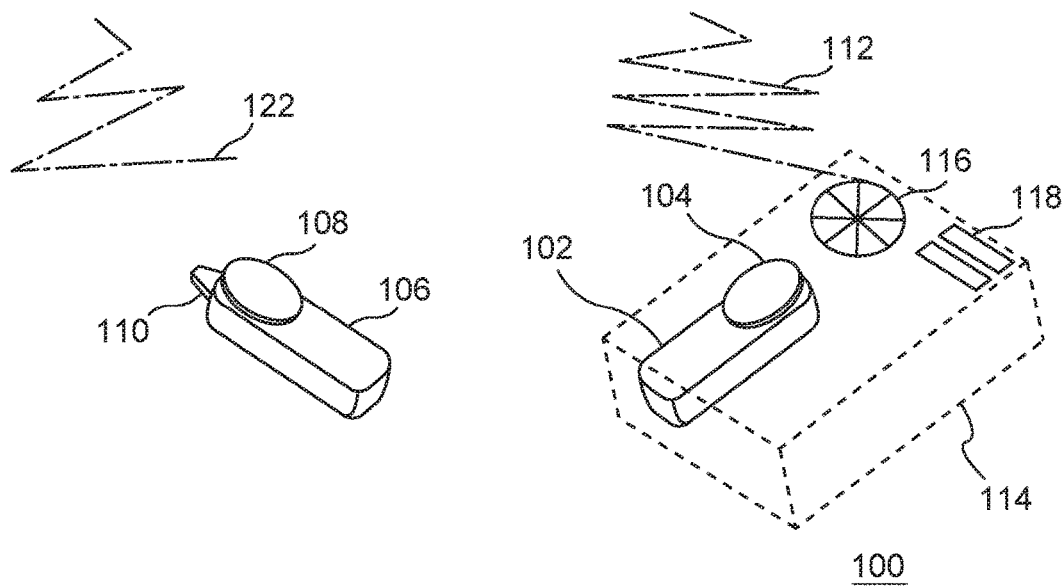

FIGS. 1A-B show an example of function allocation for virtual controllers. Here, the virtual controllers are shown in a virtual space 100 that is generated by a VR program. For example, the virtual space 100 can be visible to a person wearing a VR headset (e.g., a head-mounted display) that is coupled to the VR program. Here, a virtual controller 102 is visible in the virtual space 100, the virtual controller 102 having one or more controls 104. For example, the control(s) 104 can correspond to a physical control that is accessible on the corresponding physical controller (not shown). The shape of the virtual controller 102 can correspond to, or resemble, the shape of the physical controller. Similarly, another virtual controller 106 is also shown in the virtual space 100, the virtual controller 106 having one or more controls 108.

The person operating the VR program can hold each of the physical controllers in a respective hand, such as holding the physical controller for the virtual controller 102 in the right hand, and holding the physical controller for the virtual controller 106 in the left hand. As another example, the controllers can be attached to some part of the person's body. The controllers can be tracked as to their location, velocity and/or orientation. When the person moves the controller(s) using their hand or other part of the body, the virtual controller 102 and/or 106 can be moved accordingly in the virtual space 100.

In this example, the virtual space 100 is associated with a painting environment in the VR program. In FIG. 1A, the virtual controller 102 has a brush function allocated to it. For example, a tip 110 on the virtual controller 102 indicates that the brush function is available for that controller. The person can create brush strokes in the virtual space 100 by moving the physical controller that corresponds to the virtual controller 102. For example, here a brush stroke 112 has been created in the virtual space 100 using the virtual controller 102.

The virtual controller 106, moreover, has other functions of the VR program allocated to it. Here, a virtual tool box 114 is schematically shown in the virtual space 100 as at least partially surrounding the virtual controller 106. For example, the virtual tool box 114 can be fixed relative to the virtual controller to which it is allocated, here the virtual controller 106, so that the virtual tool box 114 moves in the virtual space 100 together with that virtual controller. The virtual tool box 114 can include one or more virtual functions that are available for use.

Here, a wheel 116 on the virtual tool box 114 corresponds to a palette for the brush function of the painting environment. As such, the wheel 116 can be used for one or more palette functions in the painting environment. For example, the tip 110 can be brought in contact with a selected portion of the wheel 116 to assign a particular color, texture, pattern and/or other paint characteristic to the paintbrush. For example, one or more characteristics of the brush stroke 112 can be controlled using the wheel 116. One or more other functions can be associated with the tool box 114. Here, functions 118 are schematically illustrated. These can relate to other functions of the painting environment, such as the selecting of a different marking implement (such as a pen) and/or to changing some aspect of the current marking implement (such as its thickness).

In some implementations, the virtual controller 102 can currently be considered the dominant controller because it is to be used for the relatively more demanding operations of applying markings to the virtual space 100. The virtual controller 106, in contrast, can currently be considered the non-dominant controller because its purpose can largely be to furnish one or more tools that are to be used by the virtual controller 102, and/or to augment the functionality of the virtual controller 102.

The VR program can provide one or more ways of allocating and/or de-allocating functions in the virtual space 100. In some implementations, a function can be swapped between the virtual controllers 102 and 106, as schematically illustrated by a swapping function 120. For example, this can be used to effectuate a shift of the dominant controller from one hand to the other, without the user needing to physically switch the physical controllers in her hands. The swapping function 120 can be triggered by performing a predefined gesture using one or more of the physical controllers corresponding to the virtual controllers 102 and/or 106.

Assume that the person performs such a predefined gesture and that the system interprets this as a signal to initiate the swapping function 120. FIG. 1B shows an example of the virtual space 100 after execution of the swapping function 120. The virtual controllers 102 and 106 are currently positioned at approximately the positions they had in FIG. 1A, although in some examples they can be in different positions after the gesture is performed than before it was performed. However, functions in the VR program have been re-allocated in response to the gesture. For example, the tip 110 is no longer allocated to the virtual controller 102; rather, the tip 110 is currently allocated to the virtual controller 106. Similarly, the toolbox 114 and its associated tools are no longer allocated to the virtual controller 106 but are currently allocated to the virtual controller 102. The brush stroke 112 that was generated using the virtual controller 102 when that was defined as a marking implement remains visible in the virtual space 100. The person can now make one or more markings in the virtual space 100 using the virtual controller 106 as a marking implement. For example, the person can create another brush stroke 122 using the virtual controller 106. The virtual controller 102, in contrast, can currently be used for the wheel 116, the function(s) 118 and/or any other function associated with the virtual toolbox 114.

The swapping function 120 can provide a convenient way of allocating or de-allocating functions in the virtual space 100. For example, assume that the configuration of FIG. 1A is assigned when a person launches the VR program. That is, the brush function is currently available for activation using the right physical controller. This can be a default setting, or can be based on the spatial position of the physical controllers relative to a central unit (e.g., a computer housing that runs the VR program) upon initiation. Moreover, assume that the person prefers to paint using their left hand instead of the right. The person can therefore activate the swapping function 120 to conveniently re-allocate the brush function from the virtual controller 102 to the virtual controller 106 (which is operated using the left hand), and to re-allocate the remaining functions to the virtual controller 102 (which is operated using the right hand). Once this swapping (or any other re-allocation or de-allocation) has been performed by the system, the resulting allocation(s) can be stored as a default for the VR program. For example, when the same user launches the VR program the next time, the allocations can be applied as shown in FIG. 1B. An allocation or re-allocation of one or more functions can be undone or reversed. For example, if the user against performs the predefined gesture (or another gesture) the system can undo or reverse the allocation that had previously been made.

That is, a method can be performed that includes associating, in a computer system, a virtual controller with a physical controller. For example, the virtual controller 102 can be associated with the physical controller (not shown) that the user holds in her right hand. The method can include allocating a first function to the virtual controller, the allocation providing for performance of the first function using the physical controller. For example, the brush function illustrated by the tip 110 can be allocated to the virtual controller 102. The method can include detecting a gesture performed using the physical controller. For example, the user can perform a predefined gesture to activate the swapping function 120. The method can include, in response to detecting the gesture, de-allocating the first function from, or allocating a second function with, the virtual controller. For example, the tip 110 can be de-allocated from the virtual controller 102. As another example, the virtual toolbox 114 can be allocated to the virtual controller 102.

FIGS. 2A-F show another example of function allocation for virtual controllers. Here, virtual controllers 200 and 202 are shown in a virtual space 204. For example, the virtual space 204 can be viewed using a VR headset or otherwise. Currently, the virtual controller 202 is the dominant controller, as indicated by a label "D". The label is here used for illustrative purposes and need not be visible in the virtual space 204. At least one function can be allocated to the virtual controller 202 as a result of being defined as the dominant controller.

Assume now that the user wishes to switch the dominance from the left controller to the right controller. The user can then perform a predefined gesture using one or more of the physical controllers (not shown) associated with the virtual controllers 200 and 202. Arrows 206 in FIG. 2A indicate that the user here begins separating the virtual controllers 200 and 202 from each other.

Figure 2A:
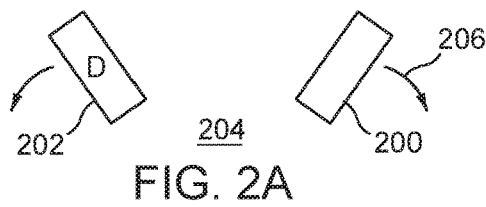
FIGS. 2A-F show another example of function allocation for virtual controllers.
Figure 2B:
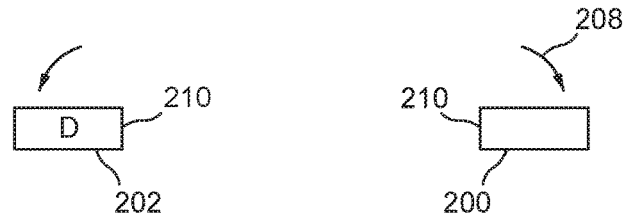

In FIG. 2B, respective arrows 208 indicate that the user has oriented the virtual controllers 200 and 202 in opposing directions. For example, respective ends 210 of the virtual controllers 200 and 202 are currently facing each other. Any end can be used, including, but not limited to, a top end and/or a bottom end of the controller.

Figure 2C:
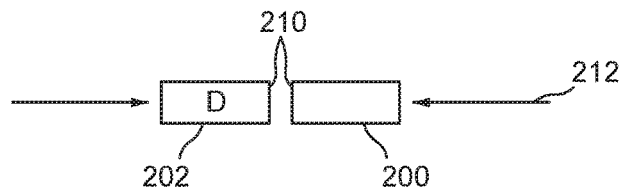

In FIG. 2C, respective arrows 212 indicate that the user moves the virtual controllers 200 and 202 toward each other, here in an essentially horizontal fashion. This can be done until the respective ends 210 of the virtual controllers 200 and 202 touch each other, or almost touch each other. In some implementations, the motion can be recognized when the virtual controllers 200 and 202 at the outset are separated by at least a minimum distance, and the motion of them toward each other is then initiated. For example, this can avoid that the user unintentionally performs the gesture.

Figure 2D:
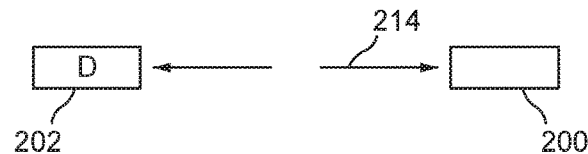

In FIG. 2D, arrows 214 indicate that the user thereafter moves the virtual controllers 200 and 202 away from each other. In some implementations, this can be done in substantially the opposite direction from how they were brought together in FIG. 2C. In some implementations, the motion can be recognized after the virtual controllers 200 and 202 are brought apart by at least a minimum distance. For example, this can avoid that the user unintentionally performs the gesture.

The motions indicated by the arrows 206, 208, 212 and/or 214 can be interpreted by the system as the deliberate performance by the user of a predefined gesture associated with allocating and/or de-allocating functionality to one or more of the virtual controllers 200 and 202. For example, the gesture can involve the physical controllers associated with the virtual controllers 200 and 202 being brought towards each other and thereafter away from each other. As another example, the gesture can involve respective ends of the physical controllers being brought toward each other, and the ends then brought apart from each other. In response to detecting such gesture(s), the system can then perform the allocation/de-allocation.

Figure 2E:

For example, the dominance can be shifted from one virtual controller to another. FIG. 2E shows that the virtual controller 200 is now the dominant one. The virtual controller 202, in contrast, is no longer the dominant controller. For example, this can be a convenient way for a person to switch the handedness of the virtual controller in one or more VR programs.

Figure 2F:
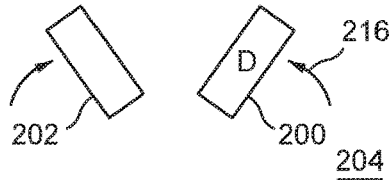

FIG. 2F shows that the user brings the virtual controllers 200 and 202 to a more upright or forward-pointing orientation, as indicated by respective arrows 216. In some implementations, this can place the virtual controller(s) in position for the user to start performing one or more functions allocated to the virtual controller(s). For example, the user can employ the now-dominant virtual controller 200 to perform one or more functions in the virtual space 204.

The performance of a gesture using at least one physical controller can be detected in one or more ways. Sensors can be used, which can be located on or inside the physical controllers and/or in another location where they can detect the position and movement of the physical controller. For example, another component of the system can include the sensor(s) so as to detect the position, velocity and/or orientation of the physical controller(s).

In some implementations, the VR system that is generating the virtual space 204 and the virtual controllers 200 and 202 can operate on a basis of frames, where each frame corresponds to an instant of the virtual space as it is to be presented to the user. For each frame, the position of one or more physical controllers can be determined by the system. If the physical controller is being moved, then its position can change from one frame to the next. Based on such frame data, the system can determine one or more characteristics about the physical controller. For example, the velocity and position of the physical controller can be extrapolated from the sensor data over two or more frames. As another example, the orientation of the physical controller (such as, the direction in which its end is pointed) can be extrapolated from sensor data. For example, such velocity, position and/or direction information can be used to detect a gesture, including, but not limited to, the one exemplified above.

Figure 3:
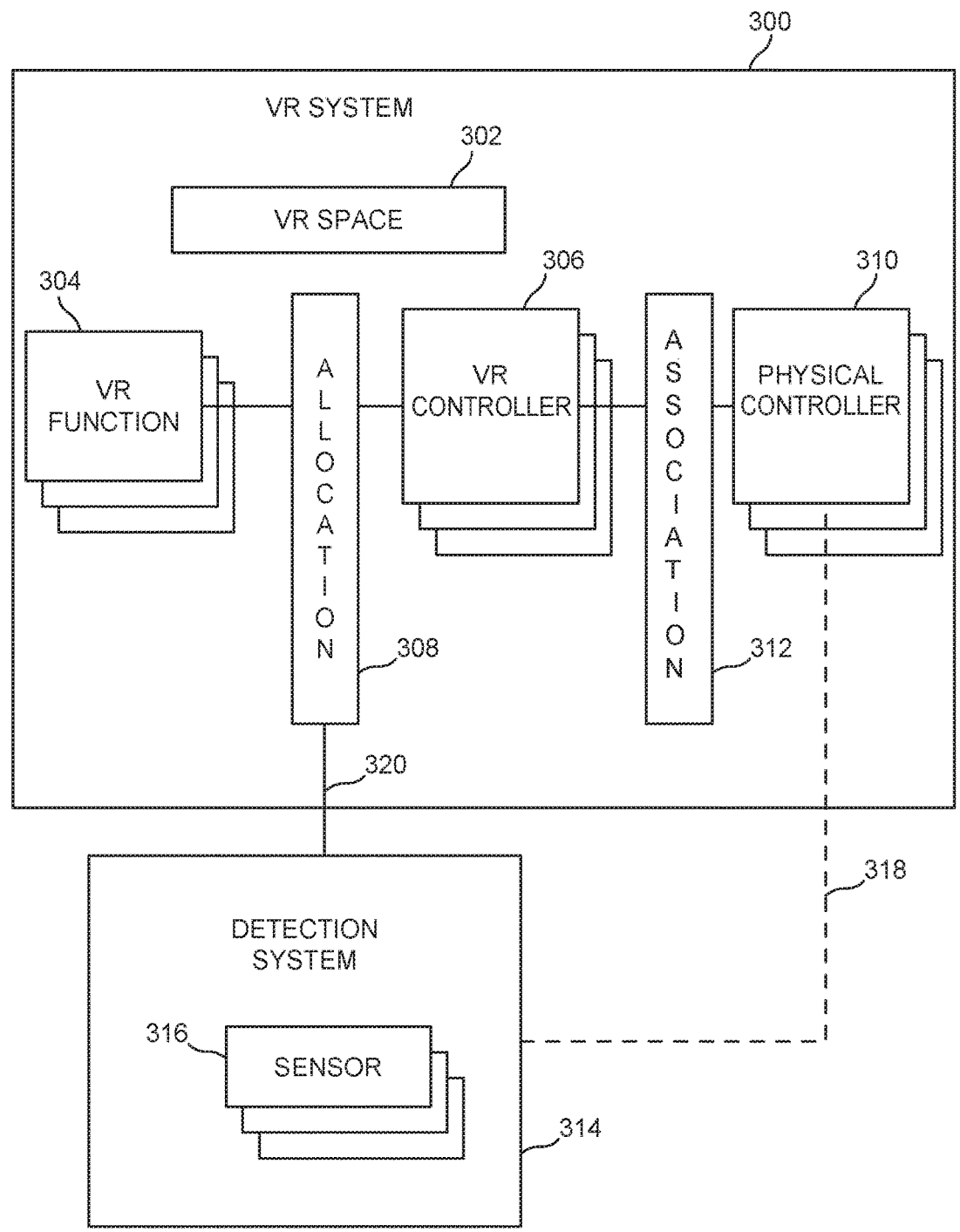
FIG. 3 shows an example of a system.

FIG. 3 shows an example of a system 300. Here, the system 300 is a VR system that generates VR functionality. That is, the VR system 300 can be used to execute one or more VR applications, for example so that a user interacts therewith using a VR headset and one or more physical controllers. In particular, the VR system 300 can generate one or more VR spaces 302. For example, the virtual space 100 (FIGS. 1A-B) and/or the virtual space 204 (FIGS. 2A-F) can be generated.

Here, the VR system 300 has defined therein multiple VR functions 304. A function can relate to any type of functionality to be provided by a VR program. In a VR program relating to graphics or other visual arts, the VR functions 304 can include a brush function and a palette function, to name just two examples.

The VR system 300 can also have defined therein multiple VR controllers 306. In some implementations, one or more of the virtual controllers 306 visually resembles a physical controller with which the user can manipulate the VR controller 306. For example, the VR controllers 306 can include the virtual controllers 102 and 106 (FIGS. 1A-B) and/or the virtual controllers 200 and 202 (FIGS. 2A-F). The VR functions 304 are allocated to respective ones of the VR controllers 306 by way of an allocation function 308. For example, one of the VR controllers 306 can have allocated thereto one or more of the VR functions 304. The VR function 304 can be indicated as a visible feature of its corresponding VR controller 306 (e.g., like the tip 110 on the virtual controller 102 in FIG. 1A). The allocation can be changed by the user and/or by the system. For example, the user can perform a predefined gesture to initiate a swapping function relating to virtual controllers, the swapping function being part of the allocation function 308.

The VR system 300 can include multiple physical controllers 310. In some implementations, the physical controller is a physical device that is tracked by the VR system in one or more regards, including, but not limited to, in terms of its position, velocity and/or orientation. For example, the physical controllers 310 can include the physical controllers used to manipulate the virtual controllers 102 and 106 (FIGS. 1A-B) and/or the virtual controllers 200 and 202 (FIGS. 2A-F). The VR controllers 306 are associated with respective ones of the physical controllers 310 by way of an association function 312. For example, one of the VR controllers 306 can be associated with one or more of the physical controllers 310. The physical controller 310 can then be used to manipulate the VR controller 306 with which it is associated. The association can be changed by the user and/or by the system.

The physical controllers 310 can be essentially identical to each other. For example, each controller can have substantially the same hardware configuration (e.g., its electronics and external form factor) as the other physical controllers, and can be distinguished by some characteristic in the signals generated (e.g., a unique identifier). In other implementations, two or more of the physical controllers 310 can have some physical difference from each other. For example, one physical controller 310 can have an external form factor configured to be held with the right hand, and another physical controller 310 can have an external form factor configured to be held with the left hand.

A detection system 314 can be used. The detection system 314 can be part of the VR system 300 and/or of the physical controllers 310, or it can be a separate component that interacts with other units, to name just a few examples. The detection system 314 is based on using one or more sensors 316 to determine some characteristic regarding at least one of the physical controllers 310. This determination is schematically illustrated using a coupling 318 between the detection system 314 and the physical controllers 310. For example, the sensor(s) 316 can be positioned on or inside the physical controller 310 and generate a signal that reflects its position, velocity and/or direction. As another example, the sensor(s) 316 can be positioned in a space where the user is employing the VR system 300 (such as in a room) and can detect the characteristics of the physical controller(s) 310 in one or more ways. Sensors can operate using one or more suitable sensing technologies. For example, and without limitation, optics, audio, electromagnetic signals or any other form of communication can be used.

The detection system 314 can generate one or more signals based on sensor data about the physical controller(s) 310. In some implementations, an extrapolation of position, velocity and/or orientation can be performed. For example, this extrapolation can be performed by the detection system 314 and provided to the allocation function 308 by way of a signal 320. As another example, the signal 320 includes raw sensor data about the physical controller(s) 310 and the VR system 300 can then perform one or more types of extrapolation (such as by the allocation function 308). As such, the allocation of one or more of the virtual functions 304 to at least one of the VR controllers 306 can be updated based on the signal 320.

Figure 4:
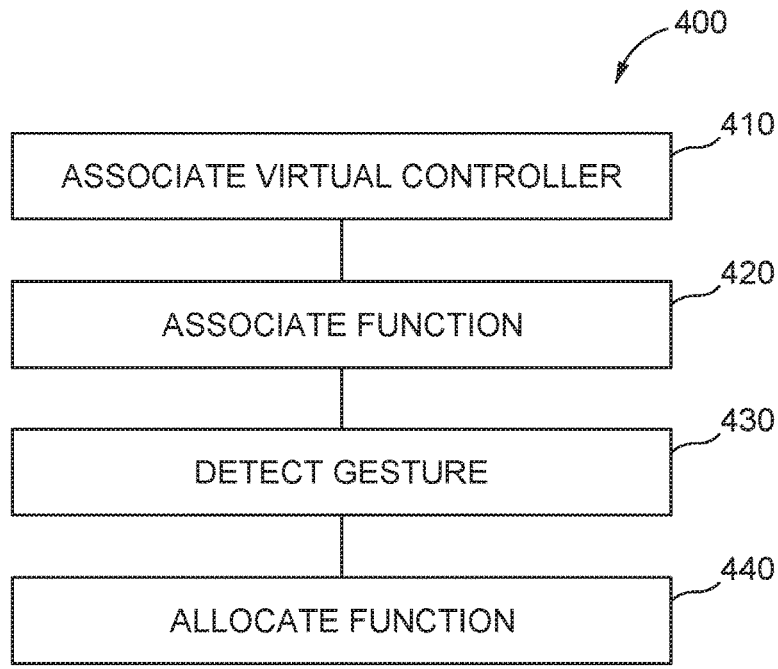
FIGS. 4-5 show examples of methods.
Figure 5:
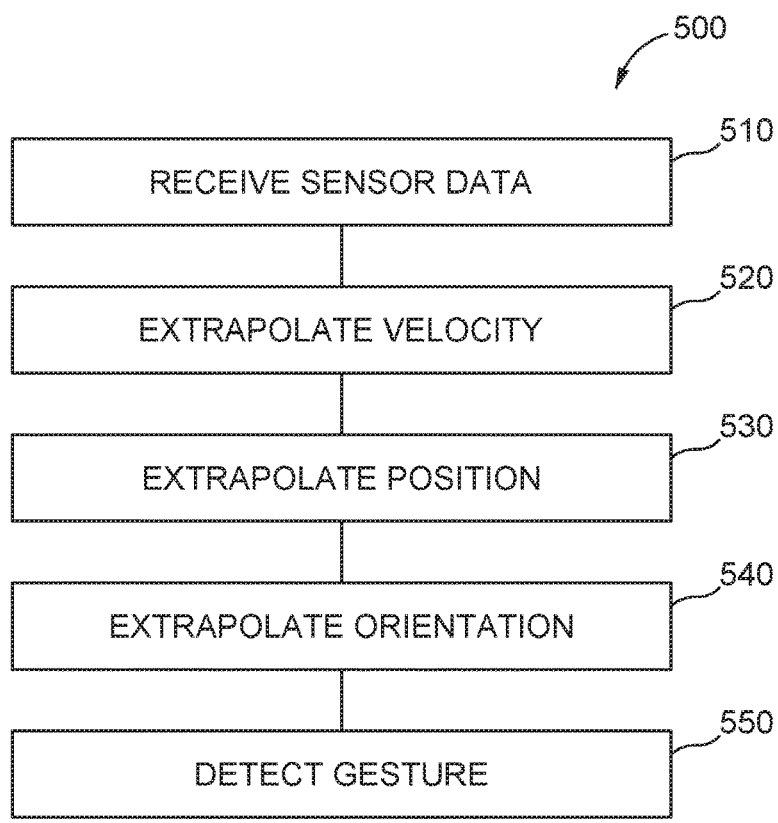

FIGS. 4-5 show examples of methods 400 and 500. The methods can be performed in a computer system, including, but not limited to, the VR system 300 (FIG. 3). In some implementations, instructions are stored in a computer program product that is tangibly embodied in a non-transitory storage medium. When executed, the instructions can cause a processor to perform operations of the method 400 and/or 500. One or more additional or fewer steps can be performed. As another example, two or more operations can be performed in a different order.

Beginning with the method 400, at 410, a virtual controller is associated with a physical controller in a computer system. At 420, a first function is allocated to the virtual controller. The allocation provides for performance of the first function using the physical controller. At 430, a gesture performed using the physical controller is detected. At 440, in response to detecting the gesture, the first function is de-allocated from, or a second function is allocated to, the virtual controller.

Turning now to the method 500, at 510, sensor data can be received. This sensor data can relate to one or more physical controllers. At 520, velocity data about the physical controller(s) can be extrapolated from the sensor data. At 530, position data about the physical controller(s) can be extrapolated from the sensor data. At 540, orientation data about the physical controller(s) can be extrapolated from the sensor data. At 550, one or more gestures made using the physical controller(s) can be detected. This can include, but is not limited to, the gestures exemplified in FIGS. 2A-F.

Figure 6A:
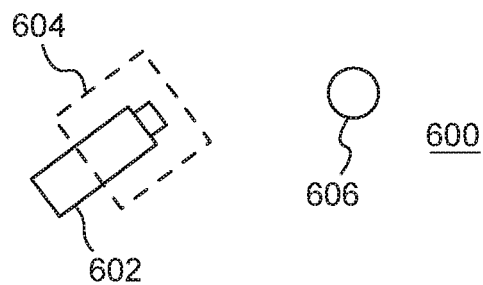
FIGS. 6A-C show another example of function allocation for virtual controllers.
Figure 6B:
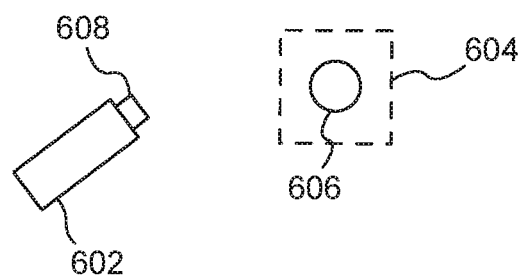
Figure 6C:
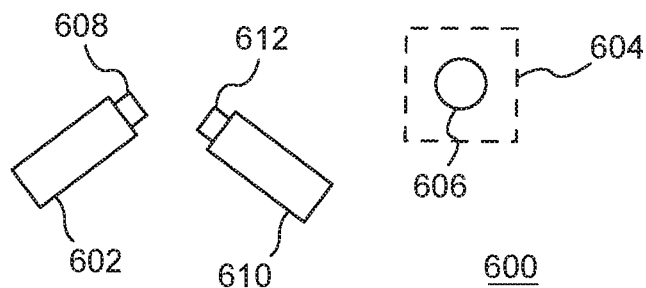

FIGS. 6A-C show another example of function allocation for virtual controllers. Here, a virtual space 600 currently includes a virtual controller 602. The virtual controller 602 can be manipulated using a physical controller (not shown). The virtual controller 602 has one or more functions allocated to it, some of which are schematically represented by a grid 604 that is visible in the virtual space 600. For example, the grid 604 can represent at least one function that the user can currently perform by manipulating the virtual controller 602 using the physical controller. Assume now that the user wishes to temporarily remove the function(s) represented by the grid 604 from the virtual controller 602. For this purpose, the user can employ a point 606 defined in the virtual space 600.

In some implementations, the user can perform a predefined gesture using at least the physical controller of the virtual controller 602. Upon the system recognizing that the gesture is performed, the system can instead allocate one or more functions of the virtual controller 602 to the point 606. FIG. 6B shows that the grid 604 is not currently allocated to the virtual controller 602 but is instead currently allocated to the point 606 in the virtual space 600. This action can be reversible, for example upon the user again performing the predefined gesture.

One or more functions allocated to the virtual controller 602 can remain after the grid 604 is de-allocated therefrom. Here, the virtual controller 602 is still provided with a tip 608. The tip 608 may have been allocated to the virtual controller 602 before the de-allocation of the grid 604. For example, in a VR program that features painting, the tip 608 can schematically represent the ability to paint (or draw) with the virtual controller 602, such as by way of a brush function. As such, the user can retain the ability to paint or draw using the virtual controller 602 also after the system de-allocates the other function(s) from the virtual controller 602. This can provide a useful flexibility. For example, FIG. 6C shows that the system can have another virtual controller 610 that is manipulated using another physical controller than the one manipulating the virtual controller 602. The virtual controller 610 can have its own corresponding tip 612. As such, the user can currently use either of the virtual controllers 602 and 610, or both of the virtual controllers 602 and 610 simultaneously, for painting in the virtual space 600. At some point, to use the function(s) of the grid 604, the user can perform the required gesture to de-allocate the function(s) from the point 606, and can instead cause the function(s) to be allocated to at least one of the virtual controllers 602 and 610.

Figure 7:
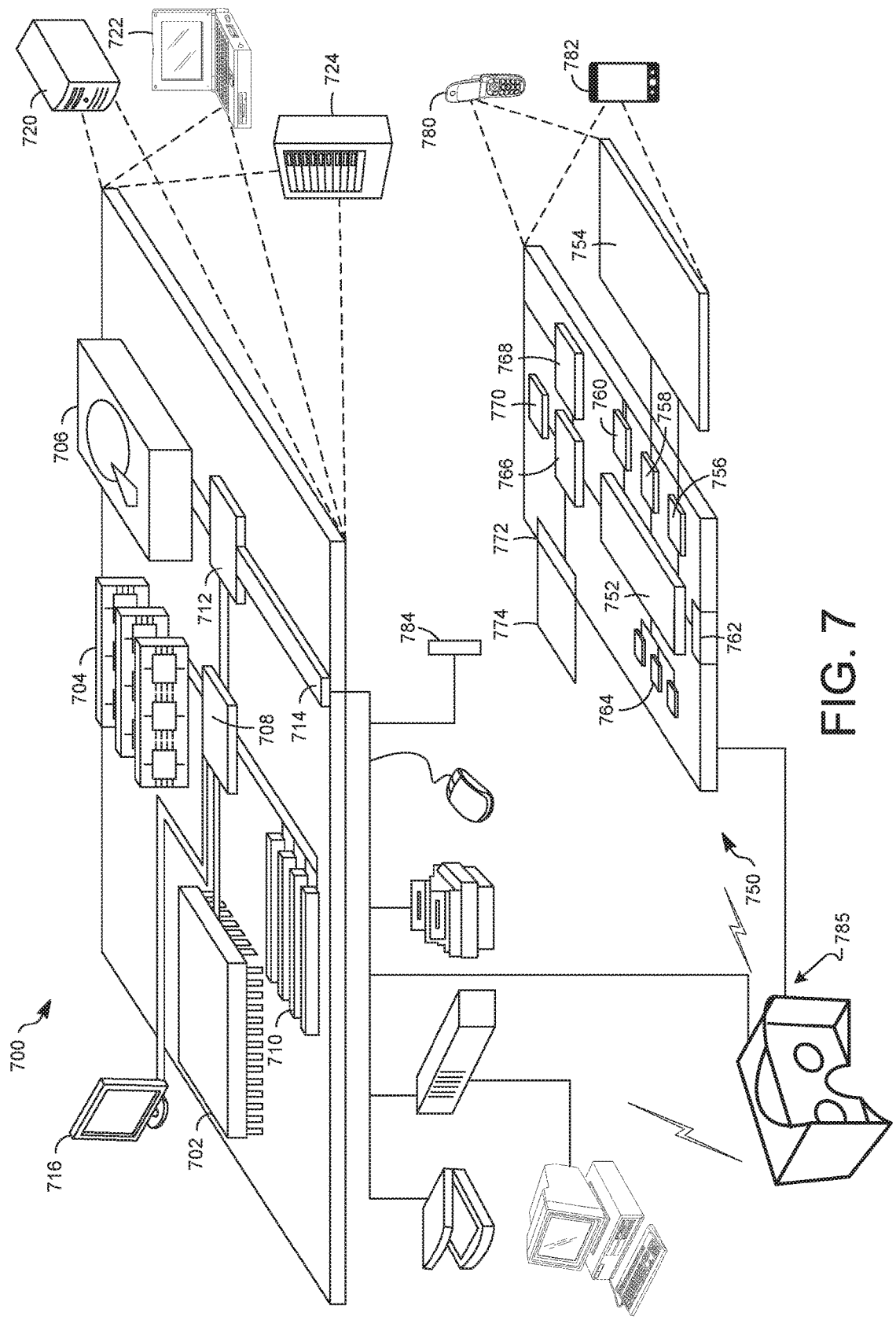
FIG. 7 shows an example of a computer device and a mobile computer device that can be used to implement the techniques described here.

FIG. 7 shows an example of a computer device and a mobile computer device that can be used to implement the techniques described here. FIG. 7 shows an example of a generic computer device 700 and a generic mobile computer device 750, which may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

A user can interact with a computing device using a tracked controller 784. In some implementations, the controller 784 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 784 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 7 can include sensors that interface with a virtual reality (VR headset 785). For example, one or more sensors included on a computing device 750 or other computing device depicted in FIG. 7, can provide input to VR headset 785 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the VR space that can then be used as input to the VR space. For example, the computing device 750 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some implementations, a touchscreen of the computing device 750 can be rendered as a touchpad in VR space. A user can interact with the touchscreen of the computing device 750. The interactions are rendered, in VR headset 785 for example, as movements on the rendered touchpad in the VR space. The rendered movements can control objects in the VR space.

In some implementations, one or more output devices included on the computing device 750 can provide output and/or feedback to a user of the VR headset 785 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the VR space. In the example of the laser pointer in a VR space, the computing device 750 appears as a virtual laser pointer in the computer-generated, 3D environment. As the user manipulates the computing device 750, the user in the VR space sees movement of the laser pointer. The user receives feedback from interactions with the computing device 750 in the VR space on the computing device 750 or on the VR headset 785.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    associating, in a computer system, a first virtual controller with a first physical controller;
    allocating a first function to the first virtual controller, the allocation providing for performance of the first function using the first physical controller;
    associating a second virtual controller in the computer system with a second physical controller;
    allocating a second function to the second virtual controller;
    detecting a gesture performed using the first physical controller; and
    in response to detecting the gesture, de-allocating the first function from, or allocating the second function to, the first virtual controller.

2. The method of claim 1, wherein in response to detecting the gesture, the first function is de-allocated from the first virtual controller, the first function is allocated to the second virtual controller, and the second function is de-allocated from the second virtual controller, and the second function is allocated to the first virtual controller.

3. The method of claim 2, wherein the first function includes a brush function in a virtual painting program and the second function includes a palette function in the virtual painting program, and wherein detecting the gesture triggers a swapping of the brush function and the palette function in the virtual painting program.

4. The method of claim 1, wherein the gesture is made using the first and second physical controllers.

5. The method of claim 4, wherein the gesture involves the first and second physical controllers being brought towards each other and thereafter away from each other.

6. The method of claim 4, wherein the gesture involves respective ends of the first and second physical controllers being brought toward each other, and the ends then brought apart from each other.

7. The method of claim 6, wherein the respective ends of the first and second physical controllers are respective bottom ends of the first and second physical controllers.

8. The method of claim 1, wherein the first and second physical controllers are identical to each other.

9. The method of claim 1, further comprising storing, in response to detecting the gesture, the de-allocation of the first function from, or the allocation of the second function with, the first virtual controller, as a default in the computer system.

10. The method of claim 1, wherein the first virtual controller is defined in a virtual space generated by the computer system, and wherein the first function is de-allocated from the first virtual controller in response to detecting the gesture, the method further comprising defining a point in the virtual space, and, in response to detecting the gesture, associating the first function with the point.

11. The method of claim 10, wherein the second function had already been allocated to the first virtual controller before the gesture was detected.

12. The method of claim 10, the method further comprising allocating the second function also to the first virtual controller.

13. The method of claim 12, wherein the first function includes a palette function in a virtual painting program, wherein the second function includes a brush function in the virtual painting program, and wherein the allocation of the second function to the first virtual controller provides that the first and second physical controller can both be used to perform the brush function in the virtual painting program.

14. The method of claim 1, wherein the gesture is detected using a sensor.

15. The method of claim 14, wherein the sensor is located on the first physical controller.

16. The method of claim 14, further comprising extrapolating velocity and position information about the first physical controller from sensor data generated by the sensor.

17. The method of claim 16, further comprising extrapolating orientation data about the first physical controller from the sensor data.

18. The method of claim 1, wherein the first virtual controller is a dominant controller, and wherein the second virtual controller is a non-dominant controller furnishing one or more tools to be used by the dominant controller.

19. A computer program product tangibly embodied in a non-transitory storage medium, the computer program product including instructions that when executed cause a processor to perform operations including:
    associating, in a computer system, a first virtual controller with a first physical controller;
    allocating a first function to the first virtual controller, the allocation providing for performance of the first function using the first physical controller;
    associating a second virtual controller in the computer system with a second physical controller;
    allocating a second function to the second virtual controller;
    detecting a gesture performed using the first physical controller; and
    in response to detecting the gesture, de-allocating the first function from, or allocating the second function to, the first virtual controller.

20. A system comprising:
    a processor; and
    a computer program product tangibly embodied in a non-transitory storage medium, the computer program product including instructions that when executed cause the processor to perform operations including:
    associating, in a computer system, a first virtual controller with a first physical controller;
    allocating a first function to the first virtual controller, the allocation providing for performance of the first function using the first physical controller;
    associating a second virtual controller in the computer system with a second physical controller;
    allocating a second function to the second virtual controller;
    detecting a gesture performed using the first physical controller; and
    in response to detecting the gesture, de-allocating the first function from, or allocating the second function to, the first virtual controller.

21. The system of claim 20, wherein the first virtual controller is a dominant controller, and wherein the second virtual controller is a non-dominant controller furnishing one or more tools to be used by the dominant controller.

* * * * *